Sept. 27, 1955  W. E. DEARLOVE  2,719,063

MASTER PIN ASSEMBLY FOR ENDLESS TRACK

Filed June 18, 1952

INVENTOR.
William E. Dearlove
BY
Chas. M. Fryer
ATTORNEY.

2,719,063

MASTER PIN ASSEMBLY FOR ENDLESS TRACK

William E. Dearlove, Phoenix, Ariz., assignor to Caterpillar Tractor Co., Peoria, Ill., a corporation of California Application June 18, 1952, Serial No. 294,295

3 Claims. (Cl. 305—10)

This invention relates to master pins or removable pins of the kind used in chains, track-type tractor tracks, and other articulated devices. The invention is adapted for use with the articulated endless track of a track-type vehicle and will be described herein by reference to such use, though its adaptability to other similar uses will be apparent as the description proceeds.

In an endless track for track-type vehicles comprising a plurality of track shoes pivotally connected by means of pins, it is conventional practice to provide at least one master pin in each track assembly which can be readily removed to separate the track for the purpose of removing the track from the vehicle. It is common practice to employ some expansible form of joint or lock including a tapered plug to cause expansion. In most cases, the master pin has been hollow or at least recessed at its ends for the reception of the tapered plug which provides the locking effect. Hollow track pins have the disadvantage of high manufacturing costs and lack the strength and durability of solid pins. Furthermore, in many cases, the tapered plugs are difficult to remove or require special tools. Since the tracks of a track-type vehicle are subjected to severe strains and operate in environments such as mud and sand, durability and simplicity are desirable features in all of their several parts.

It is, therefore the object of the present invention to provide a master pin of solid construction and of low cost for an endless track which is extremely simple to install and remove without resorting to the use of special or small tools. Further objects and advantages of the invention are made apparent in the following specification wherein a preferred form of the invention is described in detail by reference to the accompanying drawings.

Figure 1:
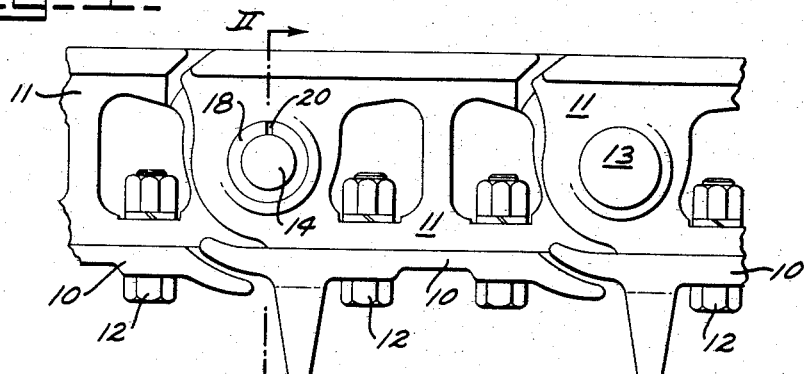
Fig. 1 is a side elevation of a part of an endless track mechanism connected by a master pin assembly embodying the present invention.

The track mechanism illustrated in Fig. 1 comprises a plurality of ground engaging track plates, such as shown at 10, each of which is rigidly secured to a pair of spaced parallel track links 11 as by bolts 12. Each pair of track links is pivotally connected by means of track pins 13 to an adjacent and cooperating pair of links in such a manner that an articulated chain is formed. The ends of this chain are pivotally connected by means of a master pin, shown at 14 in Figs. 1 and 2, forming the endless track chain which is adapted to be trained over a drive sprocket and an idler sprocket, as is customary in a track-type vehicle. It is to the construction of the master pin assembly that this invention is particularly directed.

Figure 2:
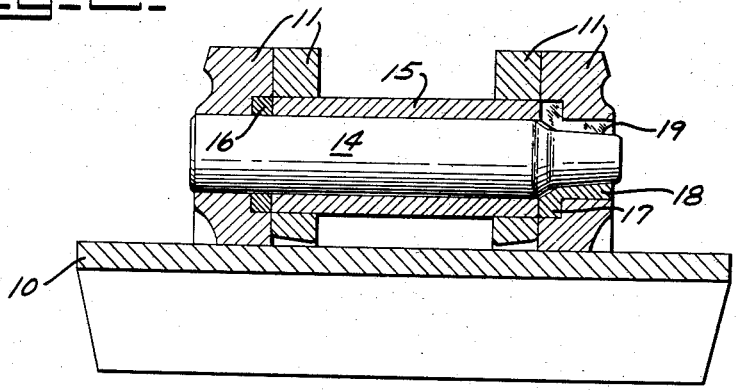
Fig. 2 is a sectional view taken along the line II—II of Fig. 1.

As shown in Fig. 2, the master pin 14 extends through suitable openings provided in the track links 11 to form a pivotal connection between the links or adjacent track plates. A track pin bushing 15, the ends of which are pressed into suitable openings in one pair of track links, is disposed about the track pin and serves as a spacer between the track links. The bushing 15 also acts as a bearing in which the track pin may oscillate. In the conventional link, the bushing 15 extends into the outer pair of links a short distance, these links being recessed to receive the track pin bushing. However, in the present master pin assembly, the track pin bushing is shorter as shown, and the recesses in the outer links are filled, one by a spacer 16, as shown in Fig. 2, and the other by a flange 17 on a tapered split sleeve 18, presently to be described in detail.

The track pin 14 is formed as a solid cylindrical member with a single reduced and tapered end 19 which serves in cooperation with the split sleeve 18 to lock it in place. The taper of the portion 19 of the track pin is exaggerated in the drawing for purposes of clarity. In actual practice a very slight taper, say for example 1 to 12, has proven satisfactory. Furthermore, the tapered portion 19 is somewhat longer than the complementary internal tapered portion of the split sleeve 18 so that the end of the track pin projects slightly beyond the sleeve in its assembled position, as illustrated in Fig. 1.

Figure 3:
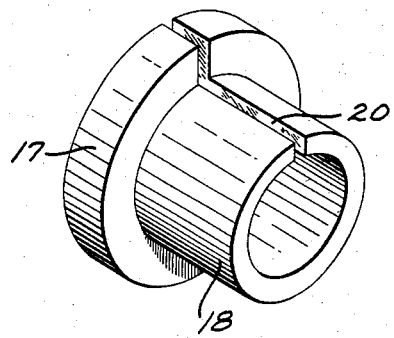
Fig. 3 is an isometric view of a tapered sleeve which forms a part of the assembly shown in Figs. 1 and 2.

The construction of the split sleeve 18 is best shown in Fig. 3 wherein it is illustrated as having a split or cut-away portion 20 throughout its length for the purpose of permitting it to expand easily. The split may be eliminated so long as the metal of which the sleeve is formed is sufficiently elastic to permit slight expansion.

In assembling the master pin of the present invention, the split sleeve is first placed in the track pin aperture of one of the outermost links 11 with its flange occupying that position usually occupied by the end of the conventional longer track pin bushing, thus limiting its outward movement. Then with the links and bushing, as well as the spacer 16, in their assembled positions, the track pin 14 is inserted and driven into place as by a hammer blow to seat the taper and simultaneously to expand the split sleeve into intimate contact with the aperture in the track link in which it is carried. The flange 17 on the sleeve prevents it from being driven out of the aperture during assembly. This locks or prevents removal of the track pin except by a similar sharp blow against its opposite or tapered end. However, the application of such an unseating blow is simple because of the protruding end of the track pin and because there is no necessity for the use of small or any additional tools in order to place the track pin assembly in condition to receive such a blow.

From the foregoing description, it is apparent that the track pin assembly of the present invention consists of a very few simple and durable parts easily assembled and disassembled and not subject to damage resulting from moisture and abrasives so often present in the environment in which the assembly must operate.

I claim:

1. For combination with an endless track or the like which includes spaced links with alined apertures for the reception of track pins, a master pin assembly comprising an expansible metal sleeve having a uniform outer diameter closely fitting within the aperture of one link, said sleeve having a tapered bore, and a master pin extending through said alined apertures and having a tapered end insertable in said bore to be frictionally retained therein and to expand said sleeve into tight engagement with the interior of said aperture.

2. For combination with an endless track or the like which includes spaced links with alined apertures for the reception of track pins, a master pin assembly comprising an expansible metal sleeve having a uniform outer diameter closely fitting within the aperture of one link, said sleeve having a tapered bore diverging toward the other link, a master pin insertable through the aperture in said other link and having a tapered end insertable in said tapered bore to expand the sleeve, and a collar on said sleeve engageable with its link to hold it in the aperture of the link when the master pin is inserted.

3. For combination with an endless track or the like which includes spaced links with alined apertures for the reception of track pins, a master pin assembly comprising an expansible metal sleeve having a uniform outer diameter closely fitting within the aperture of one link, said sleeve having a tapered bore diverging toward the other link, a master pin insertable through the aperture in said other link and having a tapered end insertable in said tapered bore to expand the sleeve, and a collar on said sleeve engageable with its link to hold it in the aperture of the link when the master pin is inserted, the tapered end of the master pin being long enough to project beyond the sleeve to facilitate its being driven out of the sleeve when the track is to be disassembled.

References Cited in the file of this patent

UNITED STATES PATENTS

| | | |
|---|---|---|
| 1,637,419 | Klein | Aug. 2, 1927 |
| 2,118,961 | Alden | May 31, 1938 |
| 2,376,864 | Eberhard | May 29, 1945 |
| 2,623,398 | Barrett | Dec. 30, 1952 |

FOREIGN PATENTS

| | | |
|---|---|---|
| 3,448 | Great Britain | 1906 |